(12) United States Patent
Nakamura

(10) Patent No.: US 8,571,779 B2
(45) Date of Patent: Oct. 29, 2013

(54) BRAKE CONTROL APPARATUS

(75) Inventor: Eiji Nakamura, Miyoshi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/879,676

(22) PCT Filed: Oct. 25, 2010

(86) PCT No.: PCT/JP2010/006301
§ 371 (c)(1),
(2), (4) Date: Apr. 16, 2013

(87) PCT Pub. No.: WO2012/056489
PCT Pub. Date: May 3, 2012

(65) Prior Publication Data
US 2013/0218435 A1 Aug. 22, 2013

(51) Int. Cl.
*G06F 7/70* (2006.01)

(52) U.S. Cl.
USPC .......... 701/70; 701/78; 303/10; 303/11; 303/15; 303/20; 303/112; 180/2.1; 180/170

(58) Field of Classification Search
USPC .......... 701/70, 78; 303/3, 7, 9.69, 10, 11, 15, 303/20, 22.6, 112, 113.1, 113.4, 113.5, 303/114.1, 119.2, 122.09, 122.13, 146, 152, 303/162; 180/2.1, 165, 65.1, 65.31, 170; 188/2.1, 165, 65.1, 65.31, 170; 903/903, 947; 477/188
See application file for complete search history.

(56) References Cited

U.S. PATENT DOCUMENTS

| | | | | |
|---|---|---|---|---|
| 5,857,755 A | * | 1/1999 | Aoki et al. | 303/152 |
| 6,033,042 A | * | 3/2000 | Klemen | 303/152 |
| 6,070,953 A | * | 6/2000 | Miyago | 303/152 |
| 6,120,115 A | * | 9/2000 | Manabe | 303/152 |
| 6,253,144 B1 | * | 6/2001 | Yamamura et al. | 701/96 |
| 6,354,672 B1 | * | 3/2002 | Nakamura et al. | 303/113.1 |
| 6,412,882 B1 | * | 7/2002 | Isono et al. | 303/114.1 |
| 7,317,980 B2 | * | 1/2008 | Aizawa et al. | 701/70 |
| 7,813,859 B2 | * | 10/2010 | Aizawa et al. | 701/70 |
| 2004/0024513 A1 | * | 2/2004 | Aizawa et al. | 701/70 |

(Continued)

FOREIGN PATENT DOCUMENTS

JP A-2002-130449 5/2002

(Continued)

*Primary Examiner* — McDieunel Marc
(74) *Attorney, Agent, or Firm* — Oliff & Berridge, PLC

(57) ABSTRACT

A brake control apparatus is provided with a frictional braking unit configured to generate frictional braking force, a regenerative braking unit configured to generate regenerative braking force, a fluid pressure control valve configured to adjust an operating fluid pressure, and a controlling unit configured to execute regenerative control to cover entire required braking force required by a driver by the regenerative braking force and executing switching control to cover the required braking force by the frictional braking force in place of the regenerative braking force by adjusting to increase the operating fluid pressure by the fluid pressure control valve when a predetermined condition is satisfied. By covering the entire required braking force by regenerative braking force and executing the switching control to adjust to increase the operating fluid pressure by the fluid pressure control valve to cover the required braking force when a predetermined condition is satisfied.

7 Claims, 8 Drawing Sheets

(56) References Cited

FOREIGN PATENT DOCUMENTS

| JP | A-2002-187537 | 7/2002 |
|---|---|---|
| JP | A-2007-203859 | 8/2007 |
| JP | A-2008-13061 | 1/2008 |
| JP | A-2009-292386 | 12/2009 |
| JP | A-2010-47201 | 3/2010 |
| JP | A-2010-173610 | 8/2010 |
| JP | WO2011/052007 A1 | 5/2011 |

* cited by examiner

BRAKE CONTROL APPARATUS

TECHNICAL FIELD

The present invention relates to a brake control apparatus, which controls braking force applied to a wheel of a vehicle.

BACKGROUND ART

Conventionally, the brake control apparatuses having a variety of configurations for controlling the braking force applied to the wheel of the vehicle are suggested. For example, patent document 1 discloses the brake control apparatus, which increases a degree of freedom of fluid pressure control in wheel cylinders of four wheels according to a condition to control the braking force. This device includes a power fluid pressure source capable of accumulating a pressure by operating fluid by using power and a manual fluid pressure source, which pressurizes the operating fluid according to a brake operational amount by a driver, and is configured to be able to control a fluid pressure in the wheel cylinder by each fluid pressure source. A fluid pressure route, which controls a left front wheel, a right front wheel, a left rear wheel, and a right rear wheel in common, is connected to the power fluid pressure source to control to pressurize the wheel cylinders of the four wheels at the time of normal control. The brake control apparatus is a regeneration cooperative brake control apparatus, which improves fuel consumption performance of the vehicle by utilizing regenerative braking force.

Also, patent document 2 discloses the brake control apparatus including the power fluid pressure source and the manual fluid pressure source. In this device, a fluid pressure flow channel for the front wheel and the fluid pressure flow channel for the rear wheel are connected to the manual fluid pressure source and braking control only by the front wheel or the rear wheel may be performed by the manual fluid pressure source.

Recently, the vehicles have a tendency to place much value on ride quality and it is desired to design a fluid pressure circuit capable of executing smooth braking regardless of technique and habit of the driver at the time of braking. In response to this demand, in a case of the conventional brake control apparatus, a pressure increasing linear control valve configured to adjust to increase a fluid pressure from a fluid pressure source and a pressure reducing linear control valve configured to adjust to reduce the same are provided such that the braking force may be finely controlled to be increased or reduced regardless of operation of a brake pedal. Also, in a case of the regeneration cooperative brake control apparatus of patent document 1, it is configured such that the vehicle is braked by distributing required braking force required by the driver at a predetermined distribution ratio by frictional braking force generated by operation of the wheel cylinder and the regenerative braking force generated by regeneration. However, since the regenerative braking force generated by the regeneration always changes according to a travel state of the vehicle, a charge state of a battery and the like, the fine control to increase or decrease the frictional braking force regardless of the operation of the brake pedal is required when the required braking force required by the driver is to be ensured. That is to say, the pressure increasing linear control valve and the pressure reducing linear control valve are required.

CITATION LIST

Patent Literature
patent document 1: Japanese Patent Application Laid-Open No. 2007-203859
patent document 2: Japanese Patent Application Laid-Open No. 2002-187537

SUMMARY OF INVENTION

Technical Problem

A low cost is currently strongly required in addition to the above-described improvement in the ride quality and improvement in the fuel consumption performance. Therefore, a simple system is desired while improving the ride quality and the fuel consumption performance and ensuring the brake performance and the reliability. For example, it is considered that, if the number of fluid pressure valves, which is great in the fluid pressure circuit, may be decreased, this may largely contribute to reduction in cost.

Therefore, an object of the present invention is to provide the brake control apparatus of which system may be made simple capable of contributing to the reduction in cost while improving the ride quality and the fuel consumption performance and ensuring the brake performance and the reliability.

Solution to Problem

A brake control apparatus according to an aspect of the present invention is provided with a frictional braking unit configured to generate frictional braking force by supplying operating fluid to a wheel cylinder provided on each wheel of a vehicle to press a frictional member against the wheel, a regenerative braking unit configured to generate regenerative braking force by power regeneration to a rotating electrical machine, which drives the wheel, a fluid pressure control valve configured to adjust an operating fluid pressure supplied from a fluid pressure source to a wheel cylinder side of each wheel, and a controlling unit configured to execute regenerative control to cover entire required braking force required by a driver by the regenerative braking force and executing switching control to cover the required braking force by the frictional braking force in place of the regenerative braking force by adjusting to increase the operating fluid pressure by the fluid pressure control valve when a predetermined condition is satisfied.

The frictional braking unit may be a disk brake apparatus, a drum brake apparatus and the like, for example. Also, the regenerative braking unit may be a regenerative brake, which uses a load generated by rotating a motor, which is a driving source of the wheel in a hybrid vehicle and an electric vehicle, by a rotating wheel during travel. The fluid pressure source may be a master cylinder unit as the manual fluid pressure source, which increases or reduces the pressure of stored operating fluid according to the brake operational amount by the driver, and an accumulator, which becomes the power fluid pressure source capable of accumulating the pressure by the operating fluid by using power independent from brake operation. The fluid pressure control valve may be an adjusting valve capable of adjusting to increase the fluid pressure from the fluid pressure source by opening operation of the valve and allowing movement of the operating fluid between the fluid pressure source and the wheel cylinder side in a fully opened state. The switching control may be cross-fade control to decrease the regenerative braking force and compensate the decrease by the frictional braking force. Meanwhile, the frictional braking force may be adjusted by separately controlling the fluid pressure of the fluid pressure source. For example, it is possible to change this according to the operational amount of the brake pedal by the driver, and when the braking becomes not necessary, the pressure may be reduced by returning depression of the brake pedal.

According to this aspect, the entire required braking force is covered by the regenerative braking force. When the required braking force changes during the regenerative control, it is possible to follow the change in the required braking force by changing an absorption rate of the regenerative energy. Also, when the switching control is executed when a predetermined condition is satisfied at the time of braking, the decreased regenerative braking force is switched to the frictional braking force by adjusting to increase the pressure by the fluid pressure control valve. Therefore, the fluid pressure is adjusted by the fluid pressure control valve at the time of the switching control. Since the control of the fluid pressure control valve at the time of fluid pressure adjustment is mostly pressure increasing control, it is possible to generate the braking force corresponding to the required braking force as in a conventional case only by controlling a regenerative braking force and controlling the pressure increasing fluid pressure control valve. As a result, the fuel consumption performance may be improved by covering the entire required braking force by the regenerative braking. Also, it becomes possible to improve the ride quality by smooth switching between the regenerative braking and the frictional braking at the time of the switching control. It becomes possible to ensure the braking performance and the reliability by finally shifting to the braking by the frictional braking force. Since the control may be realized by the regenerative braking and the pressure increasing control of the fluid pressure, the simple system may be realized.

The controlling unit may also execute the switching control when a speed of the vehicle becomes lower than a predetermined speed. When the switching control is executed, it becomes possible to smoothly shift from use of the regenerative braking force to use of the frictional braking force by gradually increasing the frictional braking force while gradually decreasing the regenerative braking force, so that switching shock of the braking force may be inhibited and the ride quality may be maintained and improved. That is to say, by starting the switching control while there is the speed at which the regenerative energy may be recovered and sufficient regenerative braking force may be obtained, it becomes possible to stably control to decrease the regenerative braking force, and it becomes easy to balance with control to increase the frictional braking force and the required braking force is easily maintained. As a result, change in the braking force is small and the ride quality may be maintained and improved. Since it is shifted to the braking control by the frictional braking force at the time of stop, the brake performance and the reliability may be certainly ensured.

The controlling unit may also execute the switching control when the required braking force becomes larger than the maximum regenerative braking force, which may be generated by the regenerative braking unit, during the regenerative control. The required braking force required by the driver might increase during the request. There is a case in which a recovery rate of the regenerative energy is limited by the charge state and a vehicle speed state during the regenerative control. As a result, there is a case in which the required braking force becomes larger than the maximum regenerative braking force. In this case, by switching from the regenerative braking force to the frictional braking force, it is possible to smoothly execute the switching control within a range of the regenerative braking force, which may be generated, while ensuring the braking force, which satisfies the required braking force, by adjusting to increase the frictional braking force.

In this case, it is possible to inhibit braking shock by drastic change in the braking force, thereby contributing to maintaining and improving the ride quality by starting the switching control while the regenerative control may be sufficiently performed.

Also, the controlling unit may execute the regenerative control when the required braking force is not larger than the maximum regenerative braking force, which may be generated by the regenerative braking unit, and cover the entire required braking force by the frictional braking force by allowing the frictional braking unit to operate without allowing the regenerative braking unit to operate when the required braking force becomes larger than the maximum regenerative braking force. The regenerative control is executed only when the required braking force is within the range of the maximum regenerative braking force, which may be generated by the regenerative braking unit, at a braking starting stage, and the required braking force is covered by the frictional braking force from the start when the required braking force is larger than the maximum regenerative braking force at the braking starting stage. In this case also, pressure reducing control of the frictional braking force is not required and the braking force corresponding to the required braking force may be generated only by the control of the pressure increasing fluid pressure control valve.

Also, the controlling unit may obtain the maximum regenerative braking force based on at least the vehicle speed, the charge amount of the regenerative charger, and the temperature of the regenerative charger before the brake operation by the driver while the vehicle travels. When the maximum regenerative braking force is set as a predetermined value, it becomes necessary to take into account a larger safety rate for the maximum regenerative braking force on assumption of various cases, so that it is required to set the maximum regenerative braking force, which is set, so as to be smaller than the regenerative braking force, which is actually obtained. On the other hand, a margin of the safety rate, which is taken into account, may be reduced by obtaining the maximum regenerative braking according to a condition during the travel before the brake operation. As a result, the recovery rate of the regenerative energy may be improved and the fuel consumption performance may be improved. Meanwhile, the maximum regenerative braking force may be obtained by calculating with the vehicle speed, the charge amount, the temperature and the like as parameters or may be obtained by referring to a map and the like of which parameter is the vehicle speed, the charge amount, the temperature and the like.

Also, the controlling unit may obtain the maximum regenerative braking force again during the regenerative control. In this case, it is possible to obtain the maximum regenerative braking force based on the parameters such as the vehicle speed, the charge amount, the temperature and the like, which may be obtained during actual regenerative control, so that the margin of the safety rate, which is taken into account, may be further reduced. As a result, the recovery rate of the regenerative energy may be further improved and the fuel consumption performance may be improved.

When the controlling unit executes the switching control, this may increase the frictional braking force at an increasing rate corresponding to a decreasing rate of the regenerative braking force to maintain the required braking force. According to this aspect, the change in the braking force at the time of the switching control may be inhibited and it is possible to switch from the regenerative braking to the frictional braking without a sense of discomfort.

The fluid pressure control valve may include a fluid pressure controlling unit configured to adjust the pressure from the power fluid pressure source capable of accumulating the pressure by the operating fluid by using the power independent from the brake operation by the driver and supplying the same to the wheel cylinder side, and a route connecting unit configured to connect and disconnect a route between the manual fluid pressure source, which increases or reduces the pressure of the stored operating fluid according to the brake operational amount by the driver and the wheel cylinder side. For example, when the accumulated fluid pressure of the power fluid pressure source is supplied to the regulator of the manual fluid pressure source and the fluid pressure is supplied to the wheel cylinder side through the regulator, the fluid pressure controlling unit and the route connecting unit may be composed of one linear control valve. When the accumulated fluid pressure of the power fluid pressure source is directly provided to the wheel cylinder side, for example, the fluid pressure controlling unit may be composed of the linear control valve and the route connecting unit configured to connect and disconnect the route between the manual fluid pressure source and the wheel cylinder side may be composed of a simple on/off valve. According to this aspect, a valve configuration may be selected according to the configuration of the fluid pressure circuit and the degree of freedom of the design is increased. In each case, the pressure reducing control of the frictional braking force becomes unnecessary and it is possible to reduce the number of parts for the pressure reducing control and reduce the control, thereby contributing to the reduction in cost.

Advantageous Effects of Invention

According to the present invention, it is possible to provide the brake control apparatus capable of simplifying the system and contributing to the reduction in cost while improving the ride quality; improving the fuel consumption performance, ensuring the brake performance, and ensuring the reliability.

DESCRIPTION OF EMBODIMENTS

A brake control apparatus according to an embodiment of the present invention includes a manual fluid pressure source and a power fluid pressure source as fluid pressure supply sources for supplying a fluid pressure to each wheel. The manual fluid pressure source of the brake control apparatus is connected to a so-called "X-pipe" type fluid pressure actuator obtained by connecting a first flow channel for supplying operating fluid to wheel cylinders of a left front wheel and a right rear wheel, for example, and a second flow channel for supplying the operating fluid to the wheel cylinders of a right front wheel and a left rear wheel. By thus forming pipes of two systems from the manual fluid pressure source into the "X-pipe", when a fail such as fluid leakage occurs in one of the first and second flow channels, braking may be performed by a brake apparatus of one of the front wheels and the brake apparatus of the rear wheel located diagonally with the front wheel by the other flow channel.

As a result, even when the fail occurs in either route of the two systems, the brake apparatus on a front wheel side and the brake apparatus on a rear wheel side may be used and similar braking force may be obtained in both of the two systems even when braking performance of the brake apparatus for the front wheel and that for the rear wheel are different from each other. For example, it is possible to use the brake apparatus of which braking performance is smaller than that on the front wheel side on the rear wheel side according to vehicle weight distribution, thereby contributing to reduction in size and cost of the brake apparatus.

Figure 1:
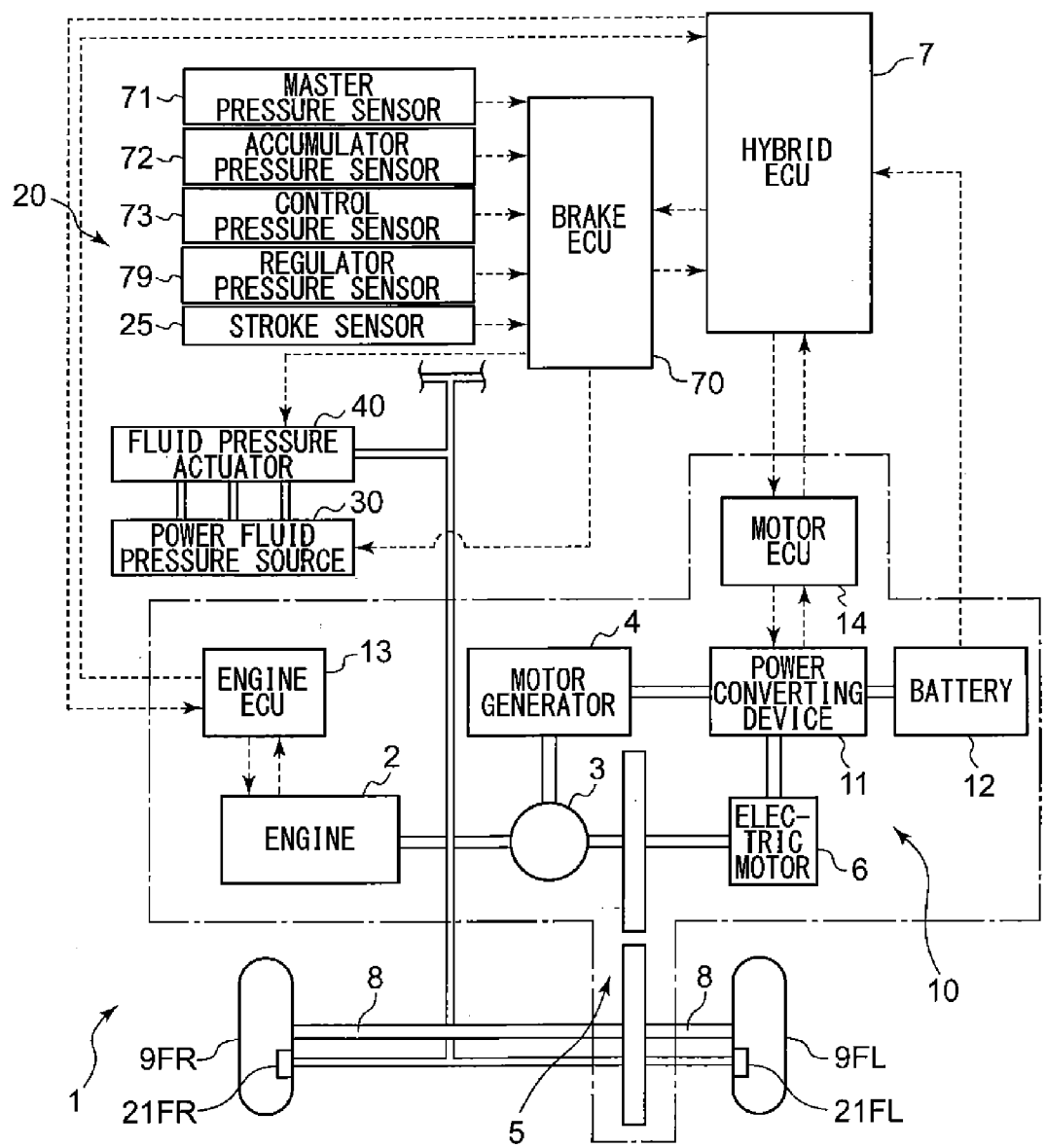
FIG. 1 is a schematic configuration diagram illustrating a vehicle to which a brake control apparatus according to one embodiment of the present invention is applied.

FIG. 1 is a schematic configuration diagram illustrating a vehicle to which the brake control apparatus according to one embodiment of the present invention is applied. A vehicle 1 illustrated in the drawing is configured as a so-called hybrid vehicle and is provided with an engine 2, a triaxial power distribution mechanism 3 connected to a crankshaft, which is an output shaft of the engine 2, a motor generator 4 capable of generating electric power connected to the power distribution mechanism 3, an electric motor 6 connected to the power distribution mechanism 3 through a transmission 5, and a hybrid electronic control unit (hereinafter, referred to as a "hybrid ECU" and every electronic control unit is referred to as an "ECU") 7, which controls an entire drive system of the vehicle 1. A right front wheel 9FR and a left front wheel 9FL, which are drive wheels of the vehicle 1, are connected to the transmission 5 through a drive shaft 8.

The engine 2 is an internal combustion engine operated by using hydrocarbon fuel such as gasoline and light oil, for example, and is controlled by an engine ECU 13. The engine ECU 13 may communicate with the hybrid ECU 7 and executes fuel injection control, ignition control, air intake control and the like of the engine 2 based on a control signal from the hybrid ECU 7 and signals from various sensors, which detect an operating state of the engine 2. The engine ECU 13 also provides information about the operating state of the engine 2 to the hybrid ECU 7 as needed.

The power distribution mechanism 3 serves to transmit an output of the electric motor 6 to the right and left front wheels 9FR and 9FL through the transmission 5, distribute an output of the engine 2 to the motor generator 4 and the transmission 5, and decrease or increase rotational speeds of the electric motor 6 and the engine 2. Each of the motor generator 4 and the electric motor 6 is connected to a battery 12, which serves as a regenerative charger, through a power converting device 11 including an inverter and a motor ECU 14 is connected to the power converting device 11. A storage cell such as a nickel-hydrogen storage cell may be used, for example, as the battery 12. The motor ECU 14 may also communicate with the hybrid ECU 7 and controls the motor generator 4 and the electric motor 6 through the power converting device 11 based on the control signal from the hybrid ECU 7 and the like. Meanwhile, each of the above-described hybrid ECU 7, engine ECU 13, and motor ECU 14 is configured as a microprocessor including a CPU and is provided with a ROM, which stores various programs, a RAM, which temporarily stores data, an input/output port, a communication port and the like in addition to the CPU.

It is possible to drive the right and left front wheels 9FR and 9FL by the output of the electric motor 6 by supplying electric power from the battery 12 to the electric motor 6 through the power converting device 11 under the control of the hybrid ECU 7 and the motor ECU 14. The vehicle 1 is driven by the engine 2 in an operating range with excellent engine efficiency. At that time, it becomes possible to drive the electric motor 6 and charge the battery 12 through the power converting device 11 by using the electric power generated by the motor generator 4 by transmitting a part of the output of the engine 2 to the motor generator 4 through the power distribution mechanism 3.

Also, when the vehicle 1 is braked, the electric motor 6 is rotated by power transmitted from the front wheels 9FR and 9FL under the control of the hybrid ECU 7 and the motor ECU 14 and the electric motor 6 is allowed to operate as a power generator. That is to say, the electric motor 6, the power converting device 11, the hybrid ECU 7, the motor ECU 14 and the like serve as a regenerative brake unit 10, which applies the braking force to the right and left front wheels 9FR and 9FL by regenerating electric energy from kinetic energy of the vehicle 1.

The brake control apparatus according to one embodiment generates required braking force by the braking using principally regenerative braking force. When a specific condition is satisfied, this generates the required braking force by determining whether to execute brake regeneration cooperative control to use the regenerative braking force and frictional braking force together or execute only the frictional braking force. The regenerative braking force is the braking force applied to the wheel by allowing a motor for driving the wheel to operate as the power generator to which rotational torque of a wheel during travel is input. At that time, the kinetic energy of the vehicle is converted to the electric energy and the electric energy is accumulated in the battery 12 from the motor through the power converting device including the inverter and the like. The accumulated electric energy is used for subsequent driving of the wheel and the like, thereby contributing to improvement in fuel consumption of the vehicle. On the other hand, the frictional braking force is the braking force applied to the wheel by pressing a frictional member against a rotating member, which rotates with the wheel. Hereinafter, the frictional braking force obtained by pressing the frictional member against the rotating member by supply of brake fluid, which is the operating fluid, from the fluid pressure source is described as an example of the frictional braking force.

Figure 2:
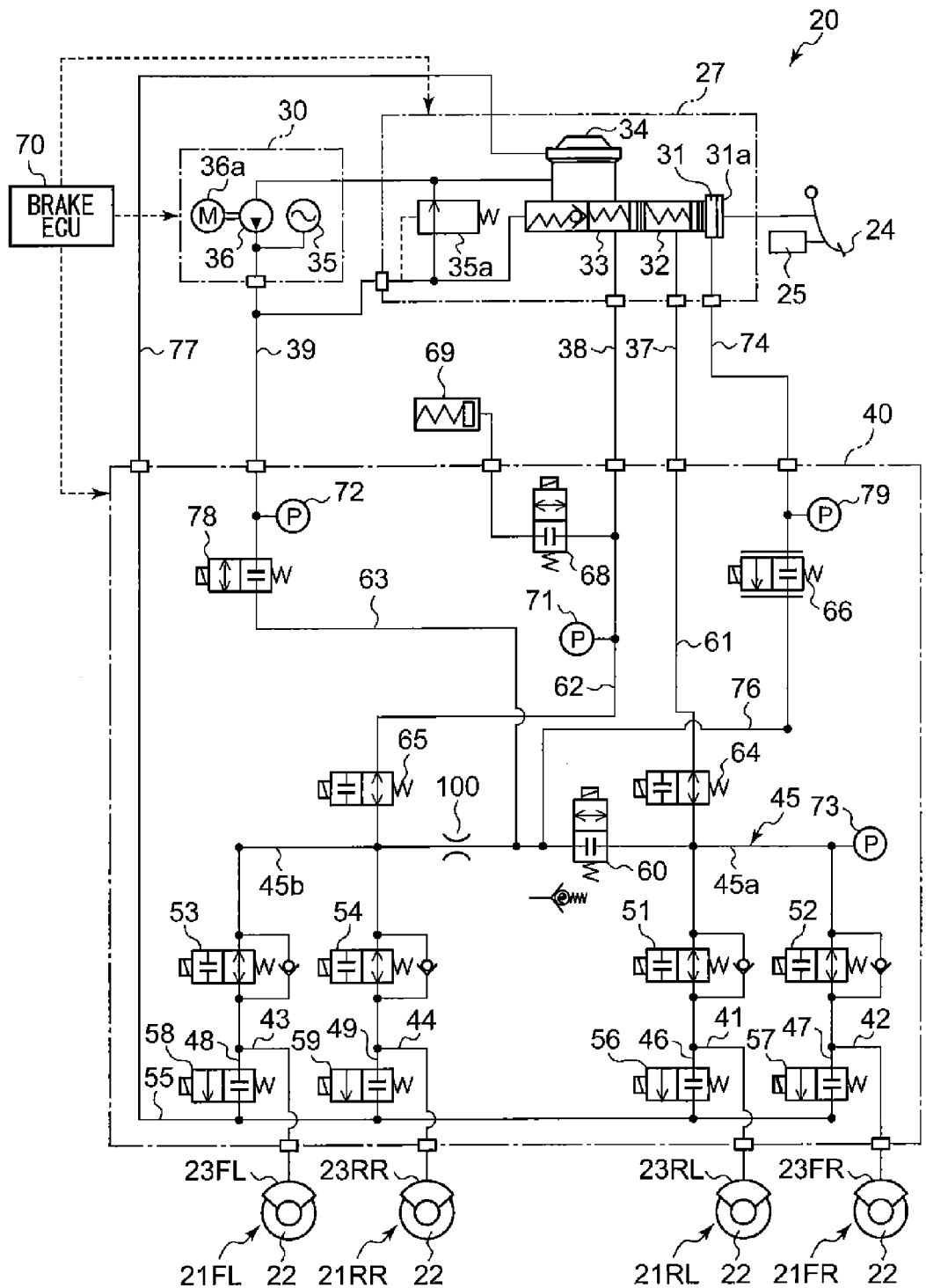
FIG. 2 is a system view illustrating a fluid pressure brake unit according to one embodiment of the present invention.

The vehicle 1 is provided with a fluid pressure brake unit 20, which generates the braking force by the supply of the brake fluid from a regulator 31 and the like, as illustrated in FIG. 2, in addition to the regenerative brake unit 10. Although the vehicle 1 generates desired braking force using principally the regenerative braking force, this may generate the desired braking force using the regenerative braking force and the frictional braking force together by executing the brake regeneration cooperative control. This may also generate the desired braking force only by the frictional braking force.

FIG. 2 is a system view illustrating the fluid pressure brake unit 20 according to this embodiment. The fluid pressure brake unit 20 includes disk brake units 21FR, 21FL, 21RR, and 21RL provided so as to correspond to respective wheels, a master cylinder unit 27, a power fluid pressure source 30, and a fluid pressure actuator 40, as illustrated in FIG. 2.

The disk brake units 21FR, 21FL, 21RR, and 21RL apply the braking force to the right front wheel, the left front wheel, the right rear wheel, and the left rear wheel of the vehicle, respectively. The master cylinder unit 27 as the manual fluid pressure source in this embodiment transmits the brake fluid pressurized according to an operational amount by a driver input through a brake pedal 24 to the disk brake units 21FR to 21RL. The power fluid pressure source 30 may transmit the brake fluid pressurized by the supply of the power to the disk brake units 21FR to 21RL independently from the operation of the brake pedal 24 by the driver. The pressurized brake fluid of the power fluid pressure source 30 may also be supplied to the regulator 31 of the master cylinder unit 27 and transmitted to the disk brake units 21FR to 21RL after a pressure thereof is appropriately adjusted according to the operational amount of the brake pedal 24. The fluid pressure actuator 40 appropriately adjusts the fluid pressure of the brake fluid supplied from the power fluid pressure source 30 or the master cylinder unit 27 to transmit to the disk brake units 21FR to 21RL. According to this, the braking force to each wheel by frictional braking is adjusted.

Each of the disk brake units 21FR to 21RL, the master cylinder unit 27, the power fluid pressure source 30, and the fluid pressure actuator 40 is hereinafter described in further detail. The disk brake units 21FR to 21RL include a brake disk 22 and wheel cylinders 23FR to 23RL incorporated in a brake caliper, respectively. The wheel cylinders 23FR to 23RL are connected to the fluid pressure actuator 40 through different fluid channels. Meanwhile, the wheel cylinders 23FR to 23RL are hereinafter appropriately collectively referred to as the "wheel cylinders 23".

In the disk brake units 21FR to 21RL, when the brake fluid is supplied from the fluid pressure actuator 40 to the wheel cylinder 23, a brake pad as the frictional member is pressed against the brake disk 22, which rotates together with the wheel. According to this, the braking force is applied to each wheel. Meanwhile, although the disk brake units 21FR to 21RL are used in this embodiment, another braking force applying mechanism including the wheel cylinder 23 such as a drum brake may be used, for example.

In this embodiment, the master cylinder 27 is of a type with a fluid pressure booster in which a master cylinder is composed of two chambers and includes a fluid pressure booster 31a, the regulator 31, a first master cylinder 32, a second master cylinder 33, and a reservoir 34. The fluid pressure booster 31a is in communication with the regulator 31 into which high-pressure brake fluid from the power fluid pressure source 30 is introduced. The fluid pressure booster 31a is connected to the brake pedal 24 and amplifies pedal force applied to the brake pedal 24 to transmit to the first master cylinder 32 and the second master cylinder 33. That is to say, the pedal force is amplified by the supply of the brake fluid from the power fluid pressure source 30 to the fluid pressure booster 31a through the regulator 31. Then, the first master cylinder 32 and the second master cylinder 33 generate substantially the same master cylinder pressures having a predetermined boost ratio to the pedal force.

The reservoir 34 for accumulating the brake fluid is arranged above the first master cylinder 32, the second master cylinder 33, and the regulator 31. The first master cylinder 32 and the second master cylinder 33 are in communication with the reservoir 34 when depression of the brake pedal 24 is released. On the other hand, the regulator 31 is in communication with both of the reservoir 34 and the accumulator 35 of the power fluid pressure source 30 and generates the fluid pressure substantially the same as the master cylinder pressure by making the reservoir 34 and the accumulator 35 a low-pressure source and a high-pressure source, respectively. The fluid pressure in the regulator 31 is hereinafter appropriately referred to as a "regulator pressure". Meanwhile, it is not required that the master cylinder pressure and the regulator pressure is exactly the same and it is also possible to design the master cylinder unit 27 such that the regulator pressure is slightly higher, for example.

The power fluid pressure source 30 includes the accumulator 35 and a pump 36. The accumulator 35 is configured to convert pressure energy of the brake fluid of which pressure is increased by the pump 36 to the pressure energy of filler gas such as nitrogen, for example, approximately 14 to 22 MPa to accumulate. The pump 36 includes a motor 36a as a driving source and a suction port and a discharge port thereof are connected to the reservoir 34 and the accumulator 35, respectively. The accumulator 35 is also connected to a relief valve 35a provided on the master cylinder unit 27. When the pressure of the brake fluid in the accumulator 35 is extraordinary increased to approximately 25 MPa, for example, the relief valve 35a opens and the high-pressure brake fluid is returned to the reservoir 34.

As described above, the fluid pressure brake unit 20 includes the first master cylinder 32, the second master cylinder 33, the regulator 31, and the accumulator 35 as a supply source of the brake fluid to the wheel cylinder 23. A first master pipe 37, a second master pipe 38, a regulator pipe 74, and an accumulator pipe 39 are connected to the first master cylinder 32, the second master cylinder 33, the regulator 31, and the accumulator 35, respectively. Each of the first master pipe 37, the second master pipe 38, the regulator pipe 74, and the accumulator pipe 39 is connected to the fluid pressure actuator 40.

The fluid pressure actuator 40 includes an actuator block in which a plurality of flow channels are formed and a plurality of electromagnetic control valves. The flow channels formed in the actuator block include individual flow channels 41, 42, 43, and 44 and a main flow channel 45. The individual flow channels 41 to 44 are branched from the main flow channel 45 to be connected to the wheel cylinders 23FR, 23FL, 23RR, and 23RL of the corresponding disk brake units 21FR, 21FL, 21RR, and 21RL, respectively. According to this, each wheel cylinder 23 may be in communication with the main flow channel 45.

ABS holding valves 51, 52, 53, and 54, which are on-off valves, are provided in the middle of the individual flow channels 41, 42, 43, and 44, respectively. Each of the ABS holding valves 51 to 54 includes an on-off controlled solenoid and a spring and is a normally-opened electromagnetic control valve opened when the solenoid is in a non-energized state. Each of the ABS holding valves 51 to 54 in an opened state may circulate the brake fluid in both directions. That is to say, it is possible to allow the brake fluid to flow from the main flow channel 45 to the wheel cylinder 23 and allow the brake fluid to flow from the wheel cylinder 23 to the main flow channel 45 in an opposite direction. When the solenoid is energized and each of the ABS holding valves 51 to 54 is closed, the circulation of the brake fluid in the individual flow channels 41 to 44 is blocked.

Further, the wheel cylinder 23 is connected to a reservoir flow channel 55 through pressure reducing flow channels 46, 47, 48, and 49 connected to the individual flow channels 41 to 44, respectively. ABS pressure reducing valves 56, 57, 58, and 59, which are on-off valves, are provided in the middle of the pressure reducing flow channels 46, 47, 48, and 49, respectively. Each of the ABS pressure reducing valves 56 to 59 includes the on-off controlled solenoid and the spring and is a normally-closed electromagnetic control valve closed when the solenoid is in the non-energized state. When each of the ABS pressure reducing valves 56 to 59 is in a closed state, the circulation of the brake fluid in the pressure reducing flow channels 46 to 49 is blocked. When the solenoid is energized and each of the ABS pressure reducing valves 56 to 59 is opened, the circulation of the brake fluid in the pressure reducing flow channels 46 to 49 is allowed and the brake fluid flows back from the wheel cylinder 23 to the reservoir 34 through the pressure reducing flow channels 46 to 49 and the reservoir flow channel 55. Meanwhile, the reservoir flow channel 55 is connected to the reservoir 34 of the master cylinder unit 27 through the reservoir pipe 77.

The main flow channel 45 includes a separating valve 60 in the middle thereof. The main flow channel 45 is separated into a first flow channel 45a connected to the individual flow channels 41 and 42 and a second flow channel 45b connected to the individual flow channels 43 and 44 by the separating valve 60. The first flow channel 45a is connected to the wheel cylinder 23RL for the left rear wheel and the wheel cylinder 23FR for the right front wheel through the individual flow channels 41 and 42, respectively, and the second flow channel 45b is connected to the wheel cylinder 23FL for the left front wheel and the wheel cylinder 23RL for the right rear wheel through the individual flow channels 43 and 44, respectively. That is to say, the flow channels of the two systems are connected to the front/rear and right/left four wheel cylinders 23 in a cross-coupled so-called "X-pipe" manner. A feature of the "X-pipe" is described later.

The separating valve 60 includes the on-off controlled solenoid and the spring and is the normally-closed electromagnetic control valve closed when the solenoid is in the non-energized state. When the separating valve 60 is in the closed state, the circulation of the brake fluid in the main flow channel 45 is blocked. When the solenoid is energized and the separating valve 60 is opened, the brake fluid may circulate in both directions between the first flow channel 45a and the second flow channel 45b.

An adjusting unit configured to adjust pressure balance between the first flow channel 45a and the second flow channel 45b is provided on one of the first flow channel 45a and the second flow channel 45b separated by the separating valve 60. In a case in FIG. 2, the adjusting unit is provided on the second flow channel 45b and serves to adjust a flow amount by applying a predetermined flow resistance to the second flow channel 45b. In the case in FIG. 2, an example in which the adjusting unit is composed of an orifice 100 is illustrated. A cross-sectional area of the orifice 100 is adjusted such that the flow resistance at the time when the brake fluid passes through the orifice 100 and the flow resistance at the time when the brake fluid passes through the separating valve 60 when the separating valve 60 is opened are substantially the same. An effect of arrangement of the orifice 100 is described later in detail. Meanwhile, a direction in which the separating valve 60 is opened is configured such that the brake fluid from a pressure increasing linear control valve 66 to be described later is easily introduced as illustrated in FIG. 2 when the valve is opened. By configuring in this manner, deterioration in response of the wheel cylinder 23 due to a delay of opening the valve is prevented.

In the fluid pressure actuator 40, a first master flow channel 61 and a second master flow channel 62, which are in communication with the main flow channel 45, are formed. In more detail, the first master flow channel 61 is connected to the first flow channel 45a of the main flow channel 45 and the second master flow channel 62 is connected to the second flow channel 45b of the main flow channel 45. Also, the first master flow channel 61 is connected to the first master pipe 37, which is in communication with the first master cylinder 32. The second master flow channel 62 is connected to the second master pipe 38, which is in communication with the second master cylinder 33.

The first master flow channel 61 includes a first master cut valve 64 in the middle thereof. The first master cut valve 69 is provided on a supply route of the brake fluid from the first master cylinder 32 to each wheel cylinder 23. The first master cut valve 64 includes the on-off controlled solenoid and the spring and is the normally-opened electromagnetic control valve opened when the solenoid is in the non-energized state of which closed state is ensured by electromagnetic force generated by the solenoid supplied with specified control current. The first master cut valve 64 in the opened state may circulate the brake fluid in both directions between the first master cylinder 32 and the first flow channel 45a of the main flow channel 45. When the solenoid is energized with the specified control current and the first master cut valve 64 is closed, the circulation of the brake fluid in the first master flow channel 61 is blocked.

The second master flow channel 62 includes a second master cut valve 65 in the middle thereof. The second master cut valve 65 is provided on the supply route of the brake fluid from the second master cylinder 33 to each wheel cylinder 23. The second master cut valve 65 also includes the on-off controlled solenoid and the spring and is the normally-opened electromagnetic control valve opened in the non-energized state of the solenoid of which closed state is ensured by the electromagnetic force generated by the solenoid supplied with the specified control current. The second master cut valve 65 in the opened state may circulate the brake fluid in both directions between the second master cylinder 33 and the second flow channel 45b of the main flow channel 45. When the solenoid is energized and the second master cut valve 65 is closed, the circulation of the brake fluid in the second master flow channel 62 is blocked.

A stroke simulator 69 is connected, on an upstream side from the second master cut valve 65, to the second master flow channel 62 through a simulator cut valve 68. That is to say, the simulator cut valve 68 is provided on the flow channel, which connects the second master cylinder 33 to the stroke simulator 69. The simulator cut valve 68 includes the on-off controlled solenoid and the spring and is the normally-closed electromagnetic control valve closed when the solenoid is in the non-energized state of which opened state is ensured by the electromagnetic force generated by the solenoid supplied with the specified control current. When the simulator cut valve 68 is in the closed state, the circulation of the brake fluid between the second master flow channel 62 and the stroke simulator 69 is blocked. When the solenoid is energized and the simulator cut valve 68 is opened, the brake fluid may circulate in both directions between the second master cylinder 33 and the stroke simulator 69.

The stroke simulator 69 includes a plurality of pistons and springs and creates reaction force according to the pedal force of the brake pedal 24 by the driver when the simulator cut valve 68 is opened. As the stroke simulator 69, that having multi-stage spring properties is preferably adopted in order to improve a feeling in the brake operation by the driver.

The regulator pipe 74 extending from the regulator 31 is connected to the fluid pressure actuator 40 and a regulator flow channel 76 including the pressure increasing linear control valve 66 in the middle thereof is connected to the second flow channel 45b between the separating valve 60 and the orifice 100. The pressure increasing linear control valve 66 serves as a fluid pressure control valve configured to adjust the fluid pressure of the brake fluid to be supplied from the fluid pressure source in this embodiment to a side of the wheel cylinder 23 of each wheel, includes a linear solenoid and the spring, and is the normally-closed electromagnetic control valve closed when the solenoid is in the non-energized state. That is to say, a degree of opening of the valve is adjusted in proportion to the current supplied to the solenoid of the pressure increasing linear control valve 66. An accumulator flow channel 63 is further formed in the fluid pressure actuator 40. One end of the accumulator flow channel 63 is connected to a position between the separating valve 60 and the orifice 100 of the main flow channel 45 and the other end thereof is connected to the accumulator pipe 39, which is in communication with the accumulator 35. An accumulator cut valve 78, which blocks the accumulator flow channel 63 in the middle thereof, is provided on a route of the accumulator flow channel 63.

The pressure increasing linear control valve 66 is provided as a common pressure increasing control valve to a plurality of wheel cylinders 23 provided so as to correspond to the respective wheels. That is to say, the pressure increasing linear control valve 66 is provided as a control valve, which controls to supply the brake fluid transmitted from the regulator 31 to each wheel cylinder 23. It is preferable to provide the common pressure increasing linear control valve 66 to each wheel cylinder 23 in this manner in terms of the cost as compared to a case in which the linear control valve is provided for each wheel cylinder 23. Meanwhile, it is possible to return the brake fluid to the reservoir 34 through the regulator 31 by decreasing or releasing the depression of the brake pedal 24 in a state in which the pressure increasing linear control valve 66 is fully opened, thereby reducing the pressure in the wheel cylinder 23.

Herein, a differential pressure between an inlet and an outlet of the pressure increasing linear control valve 66 corresponds to the differential pressure between the pressure of the brake fluid in the regulator 31 and the pressure of the brake fluid in the main flow channel 45. When electromagnetic driving force corresponding to the supplied power to the linear solenoid of the pressure increasing linear control valve 66 is set to F1, biasing force of the spring is set to F2, and differential pressure acting force corresponding to the differential pressure between the inlet and the outlet of the pressure increasing linear control valve 66 is set to F3, relationship of F1+F3=F2 is satisfied. Therefore, it is possible to control the differential pressure between the inlet and the outlet of the pressure increasing linear control valve 66 by continuously controlling the supplied power to the linear solenoid of the pressure increasing linear control valve 66.

The accumulator cut valve 78 includes the on-off controlled solenoid and the spring and is the normally-closed electromagnetic control valve closed when the solenoid is in the non-energized state of which opened state is ensured by the electromagnetic force generated by the solenoid supplied with the specified control current. The circulation of the brake fluid is blocked between the accumulator 35 and the second flow channel 45b of the main flow channel 45 by the accumulator cut valve 78 in the closed state. When the solenoid is energized and the accumulator cut valve 78 is opened, the brake fluid may circulate in both directions between the accumulator 35 and the second flow channel 45b of the main flow channel 45.

Particular control such as braking force control at the time of traction control and the braking force control at the time of vehicle stability control system operation to prevent skidding at the time when the brake pedal 24 is not operated might be executed in the fluid pressure brake unit 20. The control is performed by an accumulator pressure supplied from the accumulator 35 through the accumulator cut valve 78. On the other hand, braking control to operate the brake pedal 24 other than this is performed by the regulator pressure supplied through the pressure increasing linear control valve 66. That is to say, when the braking force control is performed by linear control of the pressure increasing linear control valve 66, the supply of the brake fluid from the accumulator 35 is blocked by the accumulator cut valve 78.

In this case, the regulator pressure adjusted to be reduced by the regulator 31 based on the operation of the brake pedal 24 by the driver is supplied to the pressure increasing linear control valve 66. Therefore, the control valve of which durability is lower may be used as compared to a case in which a high-pressure accumulator pressure is supplied to the pressure increasing linear control valve 66 may be used. Also, since a control pressure is significantly lower than the accumulator pressure, controllability of the pressure increasing linear control valve 66 may be improved, and a load becomes smaller, so that this may contribute to extension of a life. Since the regulator pressure adjusted according to the operational amount of the brake pedal 24 is lower than the accumulator pressure, operation noise and vibration of the pressure increasing linear control valve 66 are advantageously decreased.

Meanwhile, when ABS control is performed, the regulator pressure may be provided according to the operational amount of the brake pedal 24, so that the pressure increasing linear control valve 66 may be fully opened. As a result, the control of the pressure increasing linear control valve 66 at the time of the ABS control becomes extremely easy and fine control is not required as in a case in which the accumulator 35 is connected to the pressure increasing linear control valve 66, so that the number of times of control may be advantageously decreased and these points also contribute to decrease in the durability and the extension of the life.

Meanwhile, at the time of the traction control and the vehicle stability control system operation, a required fluid pressure is supplied by the control of the ABS holding valves 51 to 54 and the ABS pressure reducing valves 56 to 59 by opening the accumulator cut valve 78.

In the fluid pressure brake unit 20, the power fluid pressure source 30 and the fluid pressure actuator 40 are controlled by the brake ECU 70. The brake ECU 70 is configured as the microprocessor including the CPU and is provided with the ROM, which stores the various programs, the RAM, which temporarily stores the data, the input/output port, the communication port and the like in addition to the CPU. The brake ECU 70 may communicate with a higher-level hybrid ECU 7 and the like and controls the pump 36 of the power fluid pressure source 30 and the electromagnetic control valves 51 to 54, 56 to 59, 60, 64, 65, 66, and 68, which compose the fluid pressure actuator 40, based on the control signal from the hybrid ECU 7 and the signals from the various sensors.

Also, a master pressure sensor 71, an accumulator pressure sensor 72, a control pressure sensor 73, a regulator pressure sensor 79, and a stroke sensor 25 are connected to the brake ECU 70. The master pressure sensor 71 detects the pressure of the brake fluid in the second master flow channel 62, that is to say, a second master cylinder pressure on the upstream side from the second master cut valve 65 and provides a signal indicating a detected value to the brake ECU 70. The accumulator pressure sensor 72 detects the pressure of the brake fluid in the accumulator flow channel 63, that is to say, the accumulator pressure on the upstream side from the accumulator cut valve 78 and provides a signal indicating a detected value to the brake ECU 70. The control pressure sensor 73 detects the pressure of the brake fluid in the first flow channel 45a of the main flow channel 45 and provides a signal indicating a detected value to the brake ECU 70. The regulator pressure sensor 79 detects the pressure of the brake fluid in the regulator flow channel 76, that is to say, the regulator pressure on the upstream side from the pressure increasing linear control valve 66 and provides a signal indicating a detected value to the brake ECU 70. The stroke sensor 25 detects a pedal stroke as the operational amount of the brake pedal 24 and provides a signal indicating a detected value to the brake ECU 70. The detected values of the pressure sensors 71 to 73, 79, and 25 are sequentially provided to the brake ECU 70 at predetermined intervals to be stored and held in a predetermined storage area of the brake ECU 70. Meanwhile, it is possible to provide a brake operating state detecting unit other than the stroke sensor 25 in addition to or in place of the stroke sensor 25 and connect the same to the brake ECU 70. As the brake operating state detecting unit, there is a pedal force sensor, which detects operational force of the brake pedal 24, a brake switch, which detects the depression of the brake pedal 24 and the like, for example.

In a case in which the separating valve 60 is in the opened state and the first flow channel 45a and the second flow channel 45b of the main flow channel 45 are in communication with each other, an output value of the control pressure sensor 73 indicates the fluid pressure on a low-pressure side of the pressure increasing linear control valve 66, so that this output value may be used to control the pressure increasing linear control valve 66. Also, when the pressure increasing linear control valve 66 is closed and the first master cut valve 64 is in the opened, the output value of the control pressure sensor 73 indicates a first master cylinder pressure. Further, when the separating valve 60 is opened and the first flow channel 45a and the second flow channel 45b of the main flow channel 45 are in communication with each other, and the ABS pressure reducing valves 56 to 59 are closed while the ABS holding valves 51 to 54 are opened, the output value of the control pressure sensor 73 indicates an operating fluid pressure acting on each wheel cylinder 23, that is to say, a wheel cylinder pressure.

The brake control apparatus according to this embodiment provided with the fluid pressure brake unit 20 configured in the above-described manner may execute the brake regeneration cooperative control. In response to a braking request, the brake ECU 70 starts a process. The braking request is generated when the braking force should be applied to the vehicle such as when the driver operates the brake pedal 24, for example. The brake ECU 70 repetitively executes the control at a predetermined control period until the operation of the brake pedal 24 is released, for example.

In response to the braking request, the brake ECU 70 calculates target deceleration, that is to say, the required braking force. The brake ECU 70 may calculate the required braking force based on measured values of the master cylinder pressure and the stroke, for example. Herein, the brake ECU 70 may distribute the required braking force to each wheel according to desired braking force distribution to calculate the target braking force of each wheel and control the regenerative braking force and the frictional braking force based on the target braking force in a subsequent process.

The brake ECU 70 calculates required regenerative braking force based on the required braking force. When the required braking force is smaller than maximum regenerative braking force, which may be generated, the brake ECU 70 covers entire required braking force only by the regenerative braking force, for example. The brake ECU 70 transmits the calculated required regenerative braking force to the hybrid ECU 7. The brake ECU 70 and the hybrid ECU 7 are connected to an in-vehicle network. The brake ECU 70 transmits the required regenerative braking force to the in-vehicle network. The hybrid ECU 7 receives the required regenerative braking force from the in-vehicle network. The hybrid ECU 7 controls the regenerative brake unit 10 while setting the received required regenerative braking force as a regenerative braking force target value. The hybrid ECU 7 transmits an effective value of the regenerative braking force actually generated as a result to the brake ECU 70 through the in-vehicle network. As a result, the entire required braking force is covered by the regenerative braking force.

On the other hand, when the required braking force is not smaller than the maximum regenerative braking force, the brake ECU 70 does not execute regenerative control but executes control to cover the required braking force by the frictional braking force by adjusting to increase the pressure of the brake fluid by the control of the pressure increasing linear control valve 66.

When a predetermined condition is satisfied during the regenerative control, the brake ECU 70 executes switching control to decrease the regenerative braking force and adjust to increase the pressure of the brake fluid by the control of the pressure increasing linear control valve 66, thereby covering the required braking force by the frictional braking force in place of the regenerative braking force. When the switching control is executed and the required braking force is covered by using the regenerative braking force and the frictional braking force, the brake ECU 70 receives the regenerative braking force effective value from the hybrid ECU 7. The brake ECU 70 calculates required fluid pressure braking force, which is the braking force to be generated by the fluid pressure brake unit 20, by subtracting the regenerative braking force effective value from the required braking force. The brake ECU 70 calculates a target fluid pressure of each of the wheel cylinders 23FR to 23RL based on the required fluid pressure braking force. The brake ECU 70 may correct the required fluid pressure braking force or the target fluid pressure. The brake ECU 70 controls the fluid pressure actuator 40 such that the wheel cylinder pressure becomes the target fluid pressure. The brake ECU 70 determines a value of the control current supplied to the pressure increasing linear control valve 66 by feedback control, for example. Meanwhile, there is a case in which a vehicle speed is decreased to be lower than a predetermined value, for example, 15 km/h during the regenerative control, for example, as a predetermined condition to execute the switching control. Also, the switching control is executed when increase in the required braking force is required and this becomes larger than the maximum regenerative braking force, which may be generated by the regenerative control, during the regenerative control as a predetermined condition. A predetermined condition is described later in detail.

As described above, in the fluid pressure brake unit 20, the brake fluid is supplied from the regulator 31 to each wheel cylinder 23 through the pressure increasing linear control valve 66 and the braking force is applied to the wheel during the switching control. In this case, when the required braking force is increased or decreased, the regenerative braking force is adjusted to deal with the same. Therefore, the pressure of the frictional braking force is mostly increased. When it shifts to frictional braking control to completely cover the required braking force by the frictional braking force, the pressure increasing linear control valve 66 is put into a fully opened state and the brake fluid is returned from each wheel cylinder 23 to the reservoir 34 through the pressure increasing linear control valve 66 and the regulator 31. That is to say, this is discharged to the reservoir 34 according to the operational amount of the brake pedal 24 and the braking force to be applied to the wheel is adjusted.

As described above, in the braking force control of this embodiment, the regenerative control to cover the entire required braking force required by the driver by the regenerative braking force is executed and the switching control to cover the required braking force by the frictional braking force in place of the regenerative braking force by adjusting to increase the pressure of the brake fluid by the pressure increasing linear control valve 66 is executed when a predetermined condition is satisfied. As a result, pressure reducing control of the frictional braking force by the control of the linear control valve and the like is not performed in this embodiment. That is to say, an expensive linear control valve for the pressure reducing control is not required, and this may greatly contribute to the reduction in cost.

In this embodiment, the braking force control of a so-called brake-by-wire method is performed. When the braking force control of the brake-by-wire method is performed, the brake ECU 70 puts the first master cut valve 64 into the closed state to prevent the brake fluid transmitted from the first master cylinder 32 from being supplied to the wheel cylinder 23. Further, the brake ECU 70 puts the second master cut valve 65 into the closed state and puts the simulator cut valve 68 into the opened state. This is for allowing the brake fluid transmitted from the second master cylinder 33 in association with the operation of the brake pedal 24 by the driver to be supplied not to the wheel cylinder 23 but to the stroke simulator 69. During the regenerative control, the differential pressure corresponding to magnitude of the regenerative braking force acts between the upstream side and the downstream side of the first master cut valve 64 and the second master cut valve 65.

As described above, in this embodiment, the first master flow channel 61 connected to the first master cylinder 32 and the second master flow channel 62 connected to the second master cylinder 33 are formed. The so-called "X-pipe" in which the first master flow channel 61 may be in communication with the wheel cylinder 23RL for the left rear wheel and the wheel cylinder 23FR for the right front wheel and the second master flow channel 62 may be in communication with the wheel cylinder 23FL for the left front wheel and the wheel cylinder 23RR for the right rear wheel is formed.

By adopting such "X-pipe", it is possible to realize a fail-safe function to generate sufficient braking force only by one flow channel system when the fail such as the fluid leakage occurs in the flow channel system including the first master flow channel 61 or the flow channel system including the second master flow channel 62, for example. For example, when the braking request is issued by the operation of the brake pedal 24 by the driver when the fluid leakage occurs in the flow channel system including the second master flow channel 62, the pressure increasing linear control valve 66 and the second master cut valve 65 are closed and the first master cut valve 64 is opened. In this case, the brake fluid, which flows out of the first master cylinder 32, is supplied to the wheel cylinder 23RL for the left rear wheel and the wheel cylinder 23FR for the right front wheel. That is to say, it is possible to generate the braking force by one front wheel and one rear wheel located diagonally with each other. Similarly, when the fluid leakage occurs in the flow channel system including the first master flow channel 61 also, the pressure increasing linear control valve 66 and the first master cut valve 64 are closed and the second master cut valve 65 is opened. As a result, the brake fluid, which flows out of the second master cylinder 33, is supplied to the wheel cylinder 23FL for the left front wheel and the wheel cylinder 23RR for the right rear wheel. That is to say, it is possible to generate the braking force by one front wheel and one rear wheel located diagonally with each other. In this case, the disk brake unit 21 of the front wheel may be used by using either flow channel system of the first master flow channel 61 and the second master flow channel 62. That is to say, when braking capacity of the disk brake unit 21 on the front wheel side is set to be larger than the braking capacity of the disk brake unit 21 on the rear wheel side because of the vehicle weight distribution and the like, the disk brake unit 21 on the front wheel side having larger braking capacity is used when either flow channel system is used, so that sufficient braking capacity may be exerted. In other words, when a condition such as the vehicle weight distribution is satisfied, the disk brake unit 21 of which braking capacity is smaller than that of the disk brake unit 21 on the front wheel side may be used as that on the rear wheel side. As a result, it is possible to contribute to the reduction in cost and size of the disk brake unit 21. Also, low-cost disk brake, drum brake and the like may be used as the brake apparatus for the rear wheel and there is cost advantage.

Meanwhile, in this embodiment, a master cylinder portion of the master cylinder unit 27 is separated into the two chambers, which are the first master cylinder 32 and the second master cylinder 33, such that the brake fluid in substantially the same fluid pressure state may be supplied to the first master flow channel 61 and the second master flow channel 62 at substantially the same time. Therefore, the braking force when it is braked only by the flow channel system including the first master flow channel 61 and that when it is braked only by the flow channel system including the second master flow channel 62 are substantially the same and it is possible to inhibit a sense of discomfort regarding brake feeling of the driver.

When the above-described "X-pipe" is adopted, there is an item, which should be considered when the braking force control by the brake-by-wire method to supply the brake fluid from the power fluid pressure source 30 is executed. That is to say, in order to realize the "X-pipe", the separating valve 60 is provided on the main flow channel 45 to separate the same into the first flow channel 45a and the second flow channel 45b. When the brake fluid is supplied from the power fluid pressure source 30, although the separating valve 60 is opened to allow the first flow channel 45a and the second flow channel 45b to be in communication with each other, the first flow channel 45a is the flow channel system passing through the separating valve 60 and the second flow channel 45b is the flow channel system without passing through the separating valve 60. The separating valve 60 causes the flow resistance even when this is opened, so that difference in control time and pressure difference might occur because of the separating valve 60. In the "X-pipe", when the difference in control time and the pressure difference occur between the first flow channel 45a and the second flow channel 45b, there is a case in which braking balance of the vehicle is lost and this might deteriorate the brake feeling.

Therefore, in this embodiment, it is configured such that the difference in control time and the pressure difference do not occur between a first flow channel 45a side and a second flow channel 45b side when the brake fluid passing through the pressure increasing linear control valve 66, which is a fluid amount control valve, is supplied from the first flow channel 45a and the second flow channel 45b to each wheel cylinder 23. Specifically, the orifice 100, which serves as the adjusting unit for adjusting a supply state of the brake fluid such that difference in the supply state of the brake fluid between the first flow channel 45a into which the brake fluid flows through the separating valve 60 and the second flow channel 45b into which the brake fluid flows without passing through the separating valve 60 is decreased is provided. Meanwhile, the supply state of the brake fluid adjusted by the orifice 100, which is the adjusting unit, may indicate the state at the time when supplying the brake fluid such as the flow amount and the pressure when supplying the brake fluid and timing of supply of the brake fluid, for example. The flow resistance of the orifice 100 is set substantially the same as the flow resistance at the time when the separating valve 60 is opened. It is possible to easily adjust by adjusting the cross-sectional area of the orifice 100. Meanwhile, when the adjusting unit is composed of the orifice 100, the orifice 100 does not require confirmation of an open/close state as the separating valve 60, so that it is not required to provide the pressure sensor for confirming the same and a flow channel configuration may be advantageously simplified. In this case, the pressure in the first flow channel 45a and the second flow channel 45b may be managed by the control pressure sensor 73.

By arranging the orifice 100, which generates the flow resistance the same as the flow resistance of the separating valve 60 on the main flow channel 45 across a connecting position of the regulator pipe 74 in this manner, it is possible to inhibit the difference in control time and the pressure difference from occurring when the brake fluid is supplied from the pressure increasing linear control valve 66 to the first flow channel 45a and the second flow channel 45b. As a result, deterioration in the brake feeling may be inhibited at the time of general braking using the regulator 31 even when the "X-pipe" is adopted. Meanwhile, the presence of the orifice 100 does not affect the individual flow channels 43 and 44 even when the separating valve 60 is closed and only the second flow channel 45b is used, so that the braking force may be generated by using the second master flow channel 62 in an excellent manner.

In this manner, in this embodiment, when the braking request is issued by the driver, the entire required braking force is basically covered by the regenerative braking force and when the vehicle speed becomes a predetermined speed A or lower, for example, as a predetermined condition, the switching control is executed and it is shifted from a state in which the required braking force is covered by the regenerative braking force to a state in which this is covered by the frictional braking force. As a result, it becomes possible to generate the frictional braking force mostly only by the pressure increasing control of the brake fluid. That is to say, a conventional pressure reducing linear control valve becomes not necessary and this may contribute to the reduction in cost. Also, the control for pressure reducing control becomes not necessary and a control program may be simplified.

Figure 3:
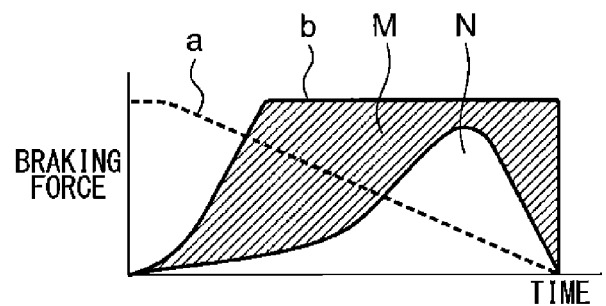
FIG. 3 is an illustrative diagram illustrating conventional shift of regenerative braking force and frictional braking force with respect to required braking force.
Figure 4:
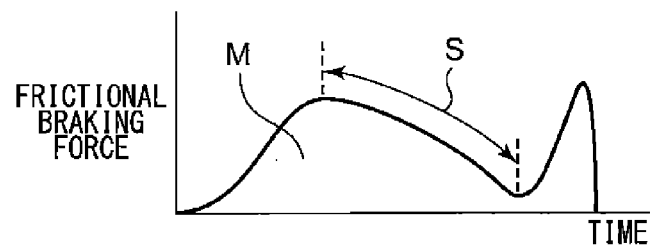
FIG. 4 is an illustrative diagram illustrating only the shift of the frictional braking force in FIG. 3.

FIG. 3 is an illustrative diagram illustrating conventional shift of the regenerative braking force and the frictional braking force with respect to the required braking force as a comparative example. FIG. 4 is an illustrative diagram illustrating only the shift of the frictional braking force in FIG. 3. In FIG. 3, the vehicle speed is indicated by a dotted line a and the required braking force required by the driver by the depression of the brake pedal 24 is indicated by a solid line b. Also, the shift of the frictional braking force is indicated by a region M and the shift of the regenerative braking force is indicated by a region N. In the conventional case, when the braking force is required by the driver, regeneration cooperative control is executed while maintaining an absorption rate of regenerative energy constant. Therefore, the regenerative braking force is small in a region in which the vehicle speed a is not yet sufficiently decreased. Therefore, the frictional braking force becomes larger in order to obtain the required braking force. When the decrease in the vehicle speed a becomes large by the braking, the regenerative braking force gradually becomes larger. In accordance with the same, the frictional braking force is decreased so as to correspond to the required braking force. When the decrease in the speed becomes larger and the regenerative braking force becomes smaller, the frictional braking force increases again corresponding to the same. As a result, it is required to decrease the frictional braking force by reduction in pressure as indicated by a curved line region S as illustrated in FIG. 4. That is to say, the linear control valve is required for reducing the pressure in the control at that time.

Figure 5:
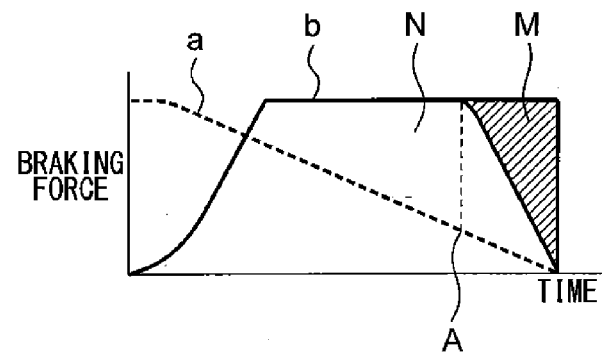
FIG. 5 is an illustrative diagram illustrating the shift of the regenerative braking force and the frictional braking force with respect to the required braking force of one embodiment of the present invention.
Figure 6:
FIG. 6 is an illustrative diagram illustrating only the shift of the frictional braking force in FIG. 5.

FIG. 5 is an illustrative diagram illustrating the shift of the regenerative braking force and the frictional braking force with respect to the required braking force of one embodiment of the present invention. FIG. 6 is an illustrative diagram illustrating only the shift of the frictional braking force in FIG. 5. As described above, in the case of this embodiment, it is configured such that the required braking force b is entirely covered by the regenerative braking force until the vehicle speed a reaches the predetermined speed A, and after the speed reaches the predetermined speed A, that is to say, after a predetermined condition is satisfied, the switching control is executed and the braking force is obtained by the regenerative braking force and the frictional braking force. As a result, as illustrated in FIG. 6, it is possible to deal with the shift of the frictional braking force mostly only by the increase in pressure as indicated by the region M. Meanwhile, when the brake ECU 70 executes the switching control, it is configured such that the required braking force is maintained by increase in the frictional braking force at an increasing rate corresponding to a decreasing rate of the regenerative braking force. That is to say, it becomes possible to smoothly shift from the use of the regenerative braking force to the use of the frictional braking force by gradually increasing the frictional braking force while gradually decreasing the regenerative braking force. As a result, switching shock of the braking force may be inhibited and ride quality may be maintained and improved by the control without the sense of discomfort. Also, by starting the switching control while there is the predetermined speed A at which the regenerative energy may be recovered and sufficient regenerative braking force may be obtained, it becomes possible to stably control to decrease the regenerative braking force. That is to say, drastic change in the regenerative braking force may be inhibited and it becomes easy to balance with control to increase the frictional braking force, so that the required braking force may be maintained easily. As a result, the ride quality may be maintained and improved. Also, since it is shifted to the braking control by the frictional braking force at the time of stop, brake performance and reliability may be certainly ensured.

Figure 7:
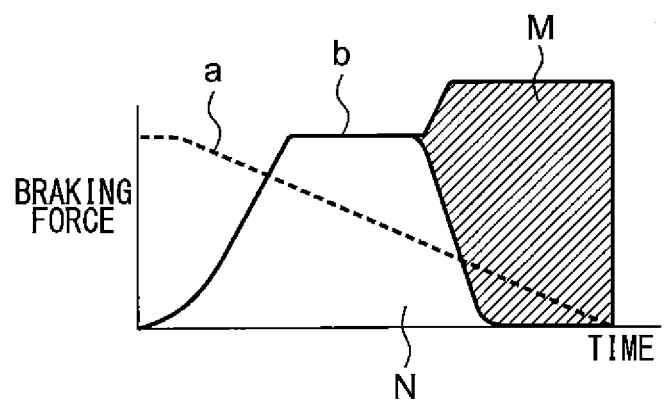
FIG. 7 is an illustrative diagram illustrating another shift of the regenerative braking force and the frictional braking force with respect to the required braking force of one embodiment of the present invention.
Figure 8:
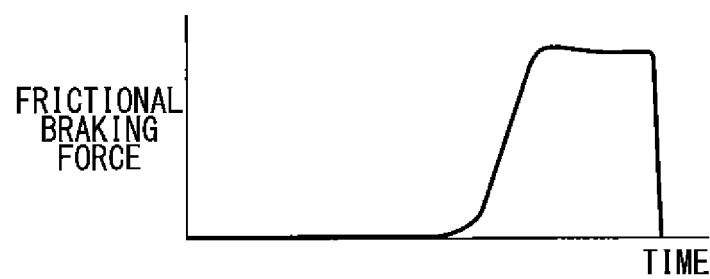
FIG. 8 is an illustrative diagram illustrating only the shift of the frictional braking force in FIG. 7.

FIG. 7 is an illustrative diagram illustrating another shift of the regenerative braking force and the frictional braking force with respect to the required braking force of one embodiment of the present invention. FIG. 8 is an illustrative diagram illustrating only the shift of the frictional braking force in FIG. 7. In this case also, as in the case in FIG. 5, when the brake pedal 24 is depressed, the required braking force is first covered by the regenerative braking force. However, FIG. 7 illustrates an example in which the required braking force by the driver is increased during the braking. In this case, there is a case in which the required braking force becomes larger than the maximum regenerative braking force and a period during which the increase and decrease in the required braking force cannot be controlled only by the regenerative braking might be generated. Therefore, when it is required to increase the required braking force during the braking, especially when it is required that the braking force is larger than the maximum regenerative braking force, that is to say, when a predetermined condition is satisfied, the switching control is executed and the control is shifted to cover the required braking force by the frictional braking force when the request to increase is issued. In this case also, it is possible to deal with the shift of the frictional braking force mostly only by increasing the pressure as indicated by the region M as illustrated in FIG. 8. Then, the switching control may be smoothly executed within a range of the regenerative braking force, which may be generated. Also, it is possible to inhibit braking shock by the drastic change in the braking force by starting the switching control while the regenerative control may be sufficiently performed, thereby contributing to maintaining and improving the ride quality. Meanwhile, if the required braking force first required is already larger than the maximum regenerative braking force, the regenerative control is not performed and it is controlled such that the entire required braking force is covered by the frictional braking force from the first. In this case also, the pressure reducing control of the frictional braking force is not required and the braking force corresponding to the required braking force may be generated only by the control of a pressure increasing fluid pressure control valve.

In this manner, it is possible to realize a simple system while improving the ride quality, improving fuel consumption performance, ensuring the brake performance, and ensuring the reliability, thereby contributing to the reduction in cost by basically entirely covering the required braking force by the regenerative braking force and executing the switching control when a predetermined condition is satisfied to shift to cover the same by the frictional braking force.

Figure 9:
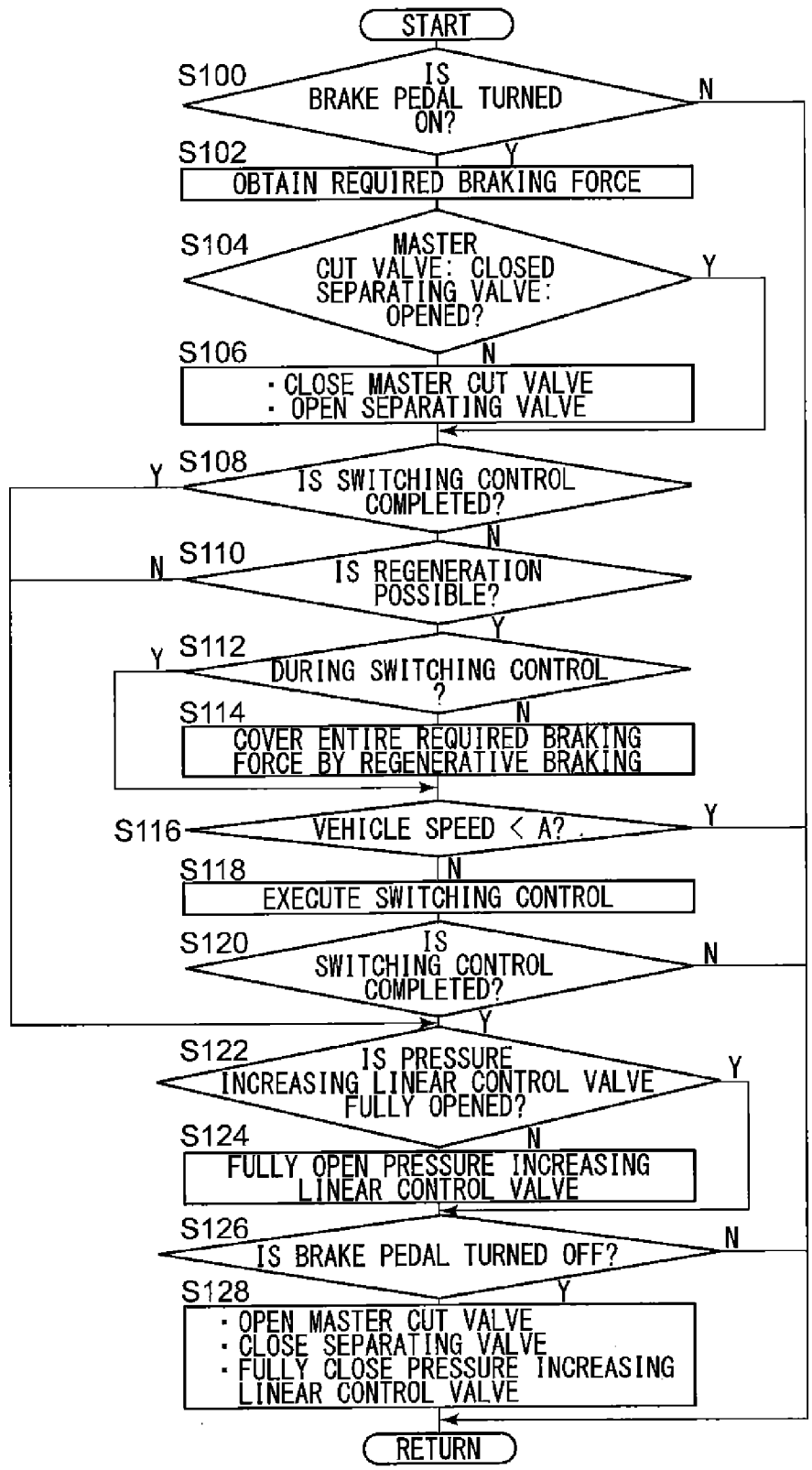
FIG. 9 is an example of a flowchart illustrating an example of regenerative control and fluid pressure control with respect to the required braking force of one embodiment of the present invention.

A control example of the brake control apparatus using the fluid pressure brake unit 20 configured in the above-described manner is described with reference to a flowchart. FIG. 9 is a flowchart illustrating an example of the regenerative control and the fluid pressure control of the brake control apparatus of this embodiment.

When the brake pedal 24 is depressed and the stroke sensor 25 is turned on (Y at S100), the brake ECU 70 obtains the required braking force (S102). In this case, the required braking force may be obtained by calculating based on an output signal of the stroke sensor 25 or may be obtained by referring to a map in which an output signal value and the required braking force are associated with each other in advance. When the brake pedal 24 is turned on, when the first master cut valve 64 and the second master cut valve 65 are not closed yet and the separating valve 60 is not opened (N at S104), the brake ECU 70 closes the first master cut valve 64 and the second master cut valve 65 and opens the separating valve 60 (S106). Meanwhile, when the first master cut valve 64 and the second master cut valve 65 are already closed and the separating valve 60 is opened at S104 (Y at S104), the process at S106 is skipped.

Then, in the operation of the brake pedal 24 of this time, when the switching control is not completed yet (N at S108), the regeneration is currently possible (S110), and it is not during the switching control (N at S112), the brake ECU 70 executes the regenerative control to cover the entire required braking force by the regenerative braking force in cooperation with the hybrid ECU 7 (S114). When the vehicle speed becomes lower than the predetermined vehicle speed A, for example, 15 km/h by the current regenerative braking (N at S116), the brake ECU 70 decreases the regenerative braking force in cooperation with the hybrid ECU 7 and adjusts to increase the pressure of the brake fluid by controlling the pressure increasing linear control valve 66 so as to increase the frictional braking force by the decrease in the regenerative braking force. That is to say, the switching control to cover the required braking force by the frictional braking force in place of the regenerative braking force is executed (S118). Meanwhile, in this case, the brake ECU 70 increases the frictional braking force at the increasing rate corresponding to the decreasing rate of the regenerative braking force to maintain the required braking force during the switching control. The switching control is executed and it is switched from the regenerative braking force to the frictional braking force in this manner in order to completely finish the regenerative braking before the vehicle stops. If the brake pedal 24 remains depressed when the vehicle stops, torque opposite to the braking, that is to say, the torque to reversely rotate the wheel acts on the wheel and the vehicle moves backward. In order to prevent this, it is switched to entirely cover the generation of the braking force by the frictional braking force before the vehicle stops.

When the switching control is completed (Y at S120), that is to say, when the effective value of the regenerative braking force by the hybrid ECU 7 becomes "0" and the required braking force is started to be entirely covered only by the frictional braking force, when the pressure increasing linear control valve 66 is not already fully opened (N at S122), the brake ECU 70 fully opens the pressure increasing linear control valve 66 (S124) to make the generation of the required braking force completely correspond to the operational amount of the brake pedal 24. That is to say, when the driver eases the brake pedal 24, the braking force decreases correspondingly and when the driver depresses the same the other way round, the braking force increases corresponding to an increased amount. At S122, when the pressure increasing linear control valve 66 is already in the fully opened state (Y at S122), the process at S124 is skipped. When the brake pedal 24 is completely turned off (Y at S126), the brake ECU 70 opens the first master cut valve 64 and the second master cut valve 65 and closes the separating valve 60. Also, this puts the pressure increasing linear control valve 66 into the fully closed state (S128). That is to say, each valve is returned to a non-braking state to be returned to an initial state ready for a next braking request and this flow is repeated.

Meanwhile, when the brake pedal 24 is not turned off at S126 (N at S126), the process at S128 is skipped and each valve is maintained in a state in which the frictional braking force is mostly generated and the process returns back to the start of the flow. When the switching control is being executed and is not completed yet at S120 (N at S120), the processes at S122 and subsequent steps are skipped and it returns back to the start of the flow. When the speed does not reach the predetermined speed A at S116 (Y at S116), the processes at S118 and subsequent steps are skipped and it returns back to the start of the flow. When it is during the switching control at S112 (Y at S112), the process at S114 is skipped. When the regenerative braking cannot be stably performed according to a state of the battery 12 and a speed state at S110 (N at S110), the processes from S112 to S120 are skipped and the process shifts to S122. Also, when the switching control is already completed at S108 (Y at S108), that is to say, when a generating state of the braking force is completely switched from the generating state of the regenerative braking force to the generating state of the frictional braking force, the processes from S110 to S120 are skipped and the process shifts to S122. Also, when the brake pedal 24 is not turned on at S100 (N at S100), it is put into a state to wait the depression of the brake pedal 24.

Figure 10:
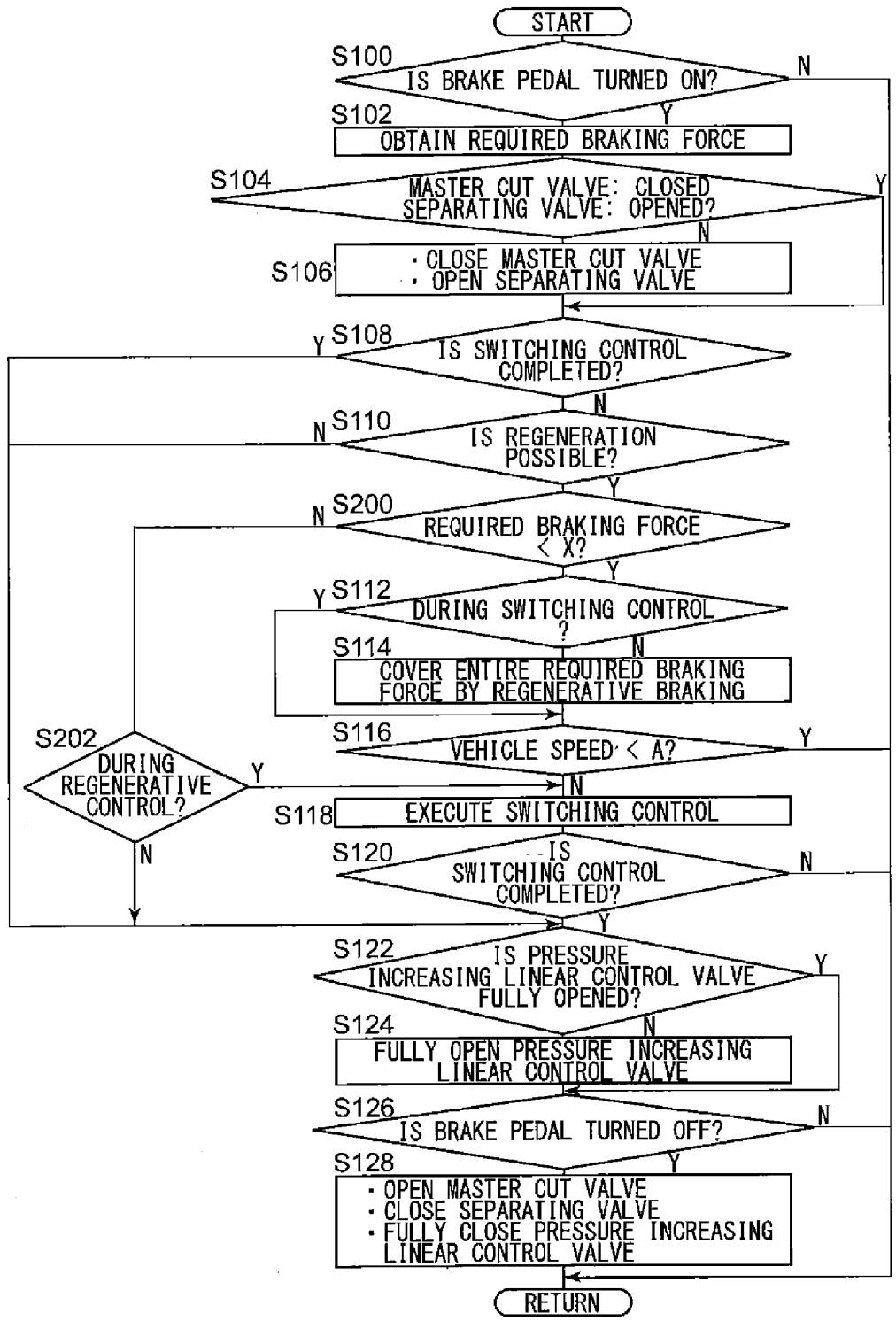
FIG. 10 is an example of a flowchart illustrating another example of the regenerative control and the fluid pressure control of the brake control apparatus according to one embodiment of the present invention.

FIG. 10 is a flowchart illustrating another example of the regenerative control and the fluid pressure control of the brake control apparatus according to one embodiment of this embodiment. In a case of the flowchart in FIG. 9, it is described that there is no special limitation in the maximum regenerative braking force and the regenerative braking force may cover any required braking force when the regenerative control may be performed. In this case, it might be necessary to increase a capacity of the battery 12 and improve performance of the electric motor 6, the electric converting device 11 and the like, and this might enlarge the system and increase the cost. Then, in a case in FIG. 10, an example of inhibiting the battery 12, the electric motor 6, the electric converting device 11 and the like from becoming large and inhibiting the cost thereof from increasing by taking into account the maximum regenerative braking force is illustrated. That is to say, by limiting a range in which the regenerative control is performed, the battery 12, the electric motor 6, the electric converting device 11 and the like similar to conventional ones may be used.

The flowchart in FIG. 10 is basically similar to the flowchart in FIG. 9 and only an added portion and a changed portion are described.

When it is judged that the regeneration is possible at S110 (Y at S110), it is confirmed whether the required braking force obtained at S102 is larger than maximum regenerative braking force X. In a case of this example, the maximum regenerative braking force may be determined based on a value calculated by energy recovery rate determined by making the vehicle speed, a charge state and a temperature state of the battery 12 ideal states for a value determined according to performance of the battery 12, the electric motor 6, the power converting device 11 and the like at a design stage and the vehicle weight in consideration of a predetermined safety rate. When the required braking force is not larger than the maximum regenerative braking force X (Y at S200), the process shifts to S112 and the processes at S112 and subsequent steps are executed. The content of the process in this case is similar to that in FIG. 9.

On the other hand, when the required braking force is larger than the maximum regenerative braking force X at S200 (N at S200), when it is not currently during the regenerative control (N at S202), that is to say, when the required braking force is larger than the maximum regenerative braking force X from the start of the braking request, the process shifts to S122 and generation control of the frictional braking force is executed by fully opening the pressure increasing linear control valve 66. Also, when the regenerative control is already executed when the required braking force becomes larger than the maximum regenerative braking force X (Y at S202), that is to say, in the state illustrated in FIG. 7, the process shifts to S118 and the switching control is executed, then it is shifted to the frictional braking force. The pressure reducing control of the frictional braking force is not performed also in the case of the braking force control, so that the pressure reducing linear control valve is not required and the pressure reducing control is not required. In this manner, by performing the control illustrated in the flowchart in FIG. 10, the regenerative control may be effectively performed according to a current vehicle state, so that an effect of improving the fuel consumption performance may be made larger.

Figure 11:
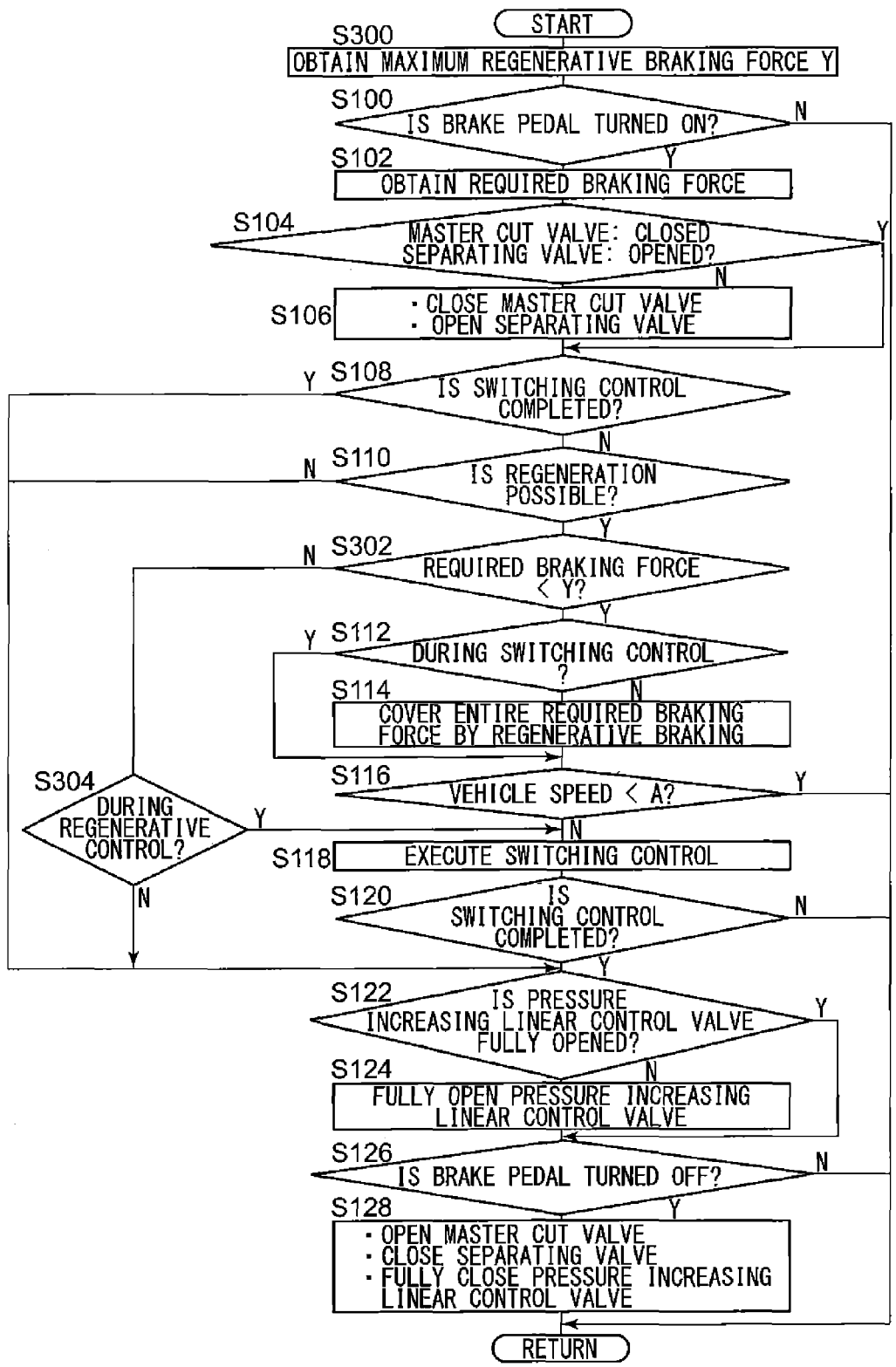
FIG. 11 is an example of a flowchart illustrating another example of the regenerative control and the fluid pressure control of the brake control apparatus according to one embodiment of the present invention.

FIG. 11 is a flowchart illustrating a variation of the control illustrated in FIG. 10. The flowchart also is basically similar to FIGS. 9 and 10, so that only the changed portion and the added portion are described.

In a case of the control in the flowchart in FIG. 11, the hybrid ECU 7 always obtains maximum regenerative braking force Y. In this case, the maximum regenerative braking force is obtained based on the energy recovery rate determined with a vehicle speed state and the charge state and the temperature state of the battery 12 at the time when the maximum regenerative braking force is obtained as parameters and the vehicle weight. Therefore, it is possible to reduce a margin of the safety rate as compared to the maximum regenerative braking force used in the flowchart in FIG. 10. That is to say, an occasion in which the regenerative control may be used increases, thereby improving the fuel consumption performance as compared to the control in FIG. 10.

Specifically, the hybrid ECU 7 always obtains the maximum regenerative braking force at a constant period, at least at a process period of the flowchart in FIG. 11 or a shorter period (S300). Then, the processes at S100 and subsequent steps are sequentially performed. When it is judged that the regeneration is possible at S110 (Y at S110), it is confirmed whether the required braking force obtained at S102 is larger than the maximum regenerative braking force Y obtained at S300. When the required braking force is not larger than the maximum regenerative braking force Y (Y at S302), the process shifts to S112 and the processes at S112 and subsequent steps are executed. The content of the process in this case is similar to that in FIG. 9.

On the other hand, when the required braking force is larger than the maximum regenerative braking force X at S302 (N at S302), when it is not currently during the regenerative control (N at S304), that is to say, when the required braking force is larger than the maximum regenerative braking force Y from the first, the process shifts to S122 and the generation control of the frictional braking force is executed by fully opening the pressure increasing linear control valve 66. Also, when the regenerative control is already executed when the required braking force becomes larger than the maximum regenerative braking force Y (Y at S304), that is to say, in the state illustrated in FIG. 7, the process shifts to S118 to execute the switching control, and it is shifted to the frictional braking force. The pressure reducing control of the frictional braking force is not performed also in the case of the braking force control, so that a pressure reducing linear control valve is not required and the pressure reducing control is not required.

Meanwhile, in a case of this flowchart, the maximum regenerative braking force Y is updated each time the flowchart is repeated and an optimal value of the maximum regenerative braking force obtained by reducing the margin of the safety rate according to the vehicle speed state and the charge state and the temperature state of the battery 12 during the braking is used and the fuel consumption performance is expected to be effectively improved. In another embodiment, the maximum regenerative braking force may be obtained only once with the vehicle speed state and the charge state and the temperature state of the battery 12 at the time when the brake pedal 24 is turned on as the parameters. In this case, although the margin of the safety rate of the maximum regenerative braking force may be reduced as compared to a case in the example in FIG. 10, this might be larger than that in the example in FIG. 11, and an improving rate of the fuel consumption performance might be smaller than that in FIG. 11. However, since an obtaining process of the maximum regenerative braking force is once and the process is simplified, a process load is advantageously reduced.

Figure 12:
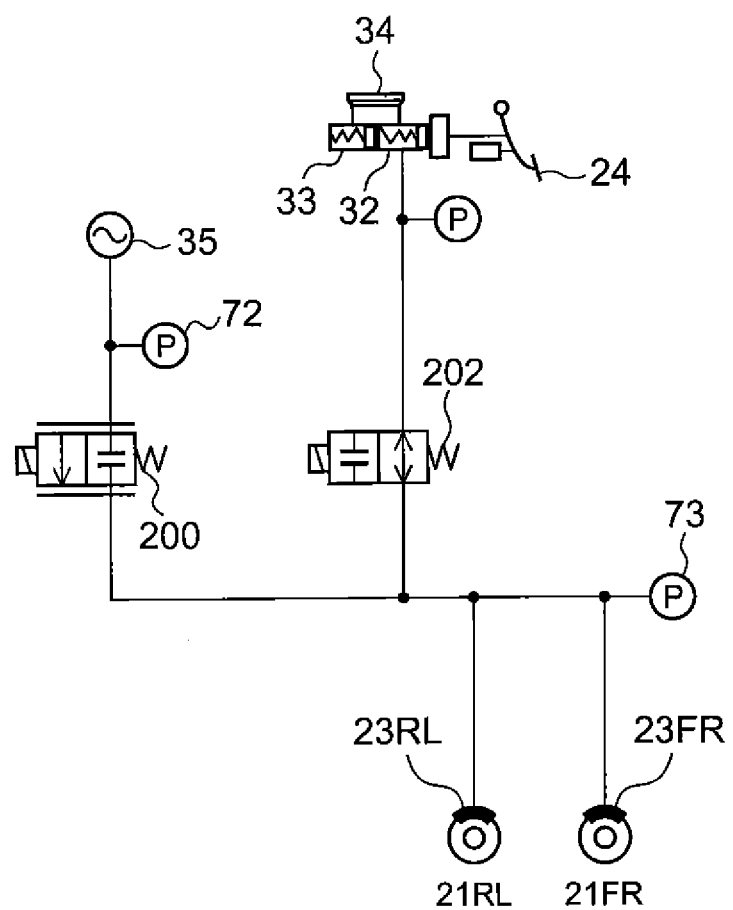
FIG. 12 is an illustrative diagram illustrating a variation of a fluid pressure control valve of the brake control apparatus according to one embodiment of the present invention.

FIG. 12 is an illustrative diagram illustrating a variation of the fluid pressure control valve of the brake control apparatus according to one embodiment of the present invention. The example in which the pressure increasing linear control valve 66 is arranged on the regulator flow channel 76 connected to the regulator pipe 74 connected to the regulator 31 is illustrated as the fluid pressure control valve illustrated in FIG. 2. On the other hand, in a case in FIG. 12, a function corresponding to the pressure increasing linear control valve 66 in FIG. 2 is composed of two parts. That is to say, this is composed of the fluid pressure controlling unit configured to adjust the pressure from the accumulator 35, which is the power fluid pressure source capable of accumulating the pressure by the operating fluid by using the power independent from the brake operation by the driver, to supply to a wheel cylinder 23 side and the route connecting unit configured to connect and disconnect a route between the first master cylinder 32, which is the manual fluid pressure source to increase/reduce the pressure of stored operating fluid according to the brake operational amount of the driver, and the wheel cylinder 23 side. In this case, the fluid pressure controlling unit may be composed of the pressure increasing linear control valve 200. Also, the route connecting unit may be composed of the cut valve 202. Meanwhile, in the case in FIG. 12, only the wheel cylinders 23RL and 23FR, which may be controlled by the first master cylinder 32, are illustrated and the wheel cylinders 23FL and 23RR, which may be controlled by the second master cylinder 33, are not illustrated. Therefore, the cut valve is provided as the route connecting unit on a second master cylinder 33 side. In a case of this example, when the switching control is executed or when only the frictional braking force is used from the first, the pressure in the wheel cylinder 23 is increased by the control of the pressure increasing linear control valve 200 based on the operational amount of the brake pedal 24 in a state in which the cut valve 202 is closed. Also, when the pressure is reduced after the switching control is finished or at the time of the control only by the frictional braking force, the pressure increasing linear control valve 200 is put into the fully closed state and the cut valve 202 is opened. Then, increasing/decreasing control of the frictional braking force is performed by change in capacity of the first master cylinder 32 by the operation of the brake pedal 24. In this case, it is possible to use the first master cut valve 64 in FIG. 2 as the cut valve 202 or the cut valve 202 may be independently provided. In this manner, the fluid pressure control valve used for the switching control in this embodiment may include the fluid pressure controlling unit configured to adjust the pressure from the power fluid pressure source capable of accumulating the pressure by the operating fluid by using the power independent from the brake operation by the driver to supply to the wheel cylinder side and the route connecting unit configured to connect and disconnect the route between the manual fluid pressure source, which increases or reduces the pressure of the stored operating fluid according to the brake operational amount by the driver, and the wheel cylinder side. Therefore, it is possible to select whether to connect the pressure increasing linear control valve to the regulator 31 or to connect the same to the accumulator 35 according to the configuration of the fluid pressure actuator 40 and a degree of freedom of design of a fluid pressure circuit may be improved. Meanwhile, the pressure increasing linear control valve 200 may be provided on another accumulator pipe in parallel with the accumulator cut valve 78 in FIG. 2 or the pressure increasing linear control valve 200 may be provided in place of the accumulator cut valve 78. In this case, the braking force control at the time of the traction control and the braking force control at the time of the vehicle stability control system operation are performed by switching full open and full close of the pressure increasing linear control valve 200.

Meanwhile, the flowcharts in FIGS. 9, 10, and 11 illustrate an example of the process and an effect similar to that of this embodiment may be obtained also by appropriately changing or modifying the same as long as the similar process is performed. Although an example in which the disk brakes are used as the brake apparatuses for all of the four wheels is illustrated in the example in FIG. 2, it is also possible to use the drum brake on the rear wheel side and use the drum brake for all of the four wheels, for example. In this case also, the effect similar to that in each of the above-described embodiments may be obtained and the cost may be easily reduced by using the drum brake. Although the "X-pipe" including the orifice 100 is illustrated as an example in FIG. 2, the orifice 100 may be omitted when it is not necessary to consider the balance of the braking force. The configuration of this embodiment is also applicable to a so-called "front-rear pipe" in which the first master cylinder 32 and the two front wheels are connected and the second master cylinder 33 and the two rear wheels are connected and the similar effect may be obtained.

The present invention is not limited to each of the above-described embodiments and various modifications such as design change may be made based on the knowledge of one skilled in the art. The configuration illustrated in each drawing is for illustrating an example and it is possible to appropriately change the same as long as the configuration may achieve the similar function, and the similar effect may be obtained.

INDUSTRIAL APPLICABILITY

According to the present invention, the brake control apparatus capable of simplifying the system while improving the ride quality, improving the fuel consumption performance, ensuring the brake performance, and ensuring the reliability may be provided.

DESCRIPTION OF REFERENCE NUMERALS

20 fluid pressure brake unit
27 master cylinder unit
30 power fluid pressure source
35 accumulator,
36 pump
37 first master pipe
38 second master pipe
40 fluid pressure actuator
51 to 54 ABS holding valve
56 to 59 ABS pressure reducing valve
60 separating valve
66 pressure increasing linear control valve
70 brake ECU
100 orifice

What is claimed is:

1. A brake control apparatus, comprising:
a frictional braking unit configured to generate frictional braking force by supplying operating fluid to a wheel cylinder provided on each wheel of a vehicle to press a frictional member against the wheel;
a regenerative braking unit configured to generate regenerative braking force by power regeneration to a rotating electrical machine, which drives the wheel;
a fluid pressure control valve configured to adjust an operating fluid pressure supplied from a fluid pressure source to a wheel cylinder side of each wheel; and
a controlling unit configured to execute regenerative control to cover entire required braking force required by a driver by the regenerative braking force and executing switching control to cover the required braking force by the frictional braking force in place of the regenerative braking force by adjusting to increase the operating fluid pressure by the fluid pressure control valve when a predetermined condition is satisfied,
wherein the controlling unit executes the regenerative control to cover the entire required braking force when the required braking force is not larger than maximum regenerative braking force, which may be generated by the regenerative braking unit, at the start of this request, and covers the entire required braking force by the frictional braking force by allowing the frictional braking unit to operate without allowing the regenerative braking unit to operate when the required braking force is larger than the maximum regenerative braking force at the start.

2. The brake control apparatus according to claim 1, wherein
the controlling unit executes the switching control when a speed of the vehicle becomes lower than a predetermined speed.

3. The brake control apparatus according to claim 1, wherein
the controlling unit executes the switching control when the required braking force becomes larger than the maximum regenerative braking force, which may be generated by the regenerative braking unit at that time, during the regenerative control.

4. The brake control apparatus according to claim 1, wherein
the controlling unit obtains the maximum regenerative braking force based on at least a vehicle speed, a charge amount of a regenerative charger, and a temperature of the regenerative charger before brake operation by the driver during travel of the vehicle.

5. The brake control apparatus according to claim 4, wherein
the controlling unit obtains again the maximum regenerative braking force during the regenerative control.

6. The brake control apparatus according to claim 1, wherein
the controlling unit maintains the required braking force by increasing the frictional braking force at an increasing rate corresponding to a decreasing rate of the regenerative braking force when executing the switching control.

7. The brake control apparatus according to claim 1, wherein
the fluid pressure control valve includes a fluid pressure controlling unit configured to adjust a pressure from a power fluid pressure source capable of accumulating the pressure by the operating fluid by using power independent from the brake operation by the driver to supply to the wheel cylinder side, and a route connecting unit configured to connect and disconnect a route between a manual fluid pressure source, which increases or reduces the pressure of stored operating fluid according to a brake operational amount by the driver and the wheel cylinder side.

* * * * *